(12) United States Patent
Kito et al.

(10) Patent No.: US 8,552,392 B2
(45) Date of Patent: Oct. 8, 2013

(54) CASSETTE AND RADIATION IMAGE CAPTURING SYSTEM

(75) Inventors: Eiichi Kito, Minami-ashigara (JP);
Naoyuki Nishino, Minami-ashigara (JP);
Yasunori Ohta, Yokohama (JP);
Tsuyoshi Tanabe, Odawara (JP);
Takuya Yoshimi, Yokohama (JP);
Takeshi Kuwabara, Minami-ashigara (JP); Kazuharu Ueta, Suginami-ku (JP);
Makoto Iriuchijima, Ora-gun (JP)

(73) Assignee: FUJIFILM Corporation, Tokyo (JP)

( * ) Notice: Subject to any disclaimer, the term of this patent is extended or adjusted under 35 U.S.C. 154(b) by 1124 days.

(21) Appl. No.: 12/179,803

(22) Filed: Jul. 25, 2008

(65) Prior Publication Data

US 2009/0026380 A1    Jan. 29, 2009

(30) Foreign Application Priority Data

Jul. 27, 2007   (JP) ................................. 2007-196631
Jun. 9, 2008    (JP) ................................. 2008-150566

(51) Int. Cl.
*G01T 1/24*    (2006.01)
*G01T 1/16*    (2006.01)

(52) U.S. Cl.
USPC .................... 250/370.09; 250/370.11; 378/89

(58) Field of Classification Search
USPC .............. 250/361 R–363.02, 363.07, 363.08, 250/370.09–370.11; 378/62, 98, 98.8, 102, 378/163, 205, 210
See application file for complete search history.

(56) References Cited

U.S. PATENT DOCUMENTS

| | | | |
|---|---|---|---|
| 5,622,187 A * | 4/1997 | Carol ............................. | 128/897 |
| 5,673,149 A * | 9/1997 | Okada ........................... | 359/557 |
| 5,925,882 A * | 7/1999 | Nakamura et al. ........ | 250/363.05 |
| 7,172,340 B2 * | 2/2007 | Oota ............................. | 378/189 |
| 2006/0169907 A1 * | 8/2006 | Shinden .................... | 250/370.09 |
| 2007/0176106 A1 * | 8/2007 | Hefetz ..................... | 250/363.02 |

FOREIGN PATENT DOCUMENTS

| JP | 2001-120528 A | 5/2001 |
|---|---|---|
| JP | 2002-248095 A | 9/2002 |

OTHER PUBLICATIONS

Office Action for Japanese Patent Application No. 2008-150566, dated Jul. 31, 2012.

* cited by examiner

*Primary Examiner* — Casey Bryant
(74) *Attorney, Agent, or Firm* — Sughrue Mion, PLLC (57) ABSTRACT

A radiation detecting cassette houses therein a detector for detecting a load applied to the radiation detecting cassette when a patient has moved. It is determined whether or not the patient has moved in an image capturing process based on the load detected by the detector. If it is judged that the patient has moved, then a warning is displayed, and a radiation image of the subject is inhibited from being captured.

17 Claims, 7 Drawing Sheets

FIG. 7

CASSETTE AND RADIATION IMAGE CAPTURING SYSTEM

BACKGROUND OF THE INVENTION

1. Field of the Invention

The present invention relates to a cassette storing therein a radiation conversion panel for converting a radiation that has passed through a subject into radiation image information, and a radiation image capturing system.

2. Description of the Related Art

In the medical field, there have widely been used radiation image capturing apparatus which apply a radiation to a subject and guide the radiation that has passed through the subject to a radiation conversion panel, which captures a radiation image from the radiation. Known forms of the radiation conversion panel include a conventional radiation film for recording a radiation image by way of exposure, and a stimulable phosphor panel for storing a radiation energy representing a radiation image in a phosphor and reproducing the radiation image as stimulated light by applying stimulating light to the phosphor.

The radiation film with the recorded radiation image is supplied to a developing device to develop the image, or the stimulable phosphor panel is supplied to a reading device to read the radiation image as a visible image.

In the operating room or the like, it is necessary to read out a recorded radiation image immediately from a radiation conversion panel after the radiation image is captured for the purpose of quickly and appropriately treating the patient. As a radiation conversion panel which meets such a requirement, there has been developed a radiation detector having a solid-state detector for converting a radiation directly into an electric signal or converting a radiation into visible light with a scintillator and then converting the visible light into an electric signal to read out a detected radiation image.

Such a radiation image capturing system is disclosed in Japanese Laid-Open Patent Publication No. 2002-248095, for example. In the radiation image capturing system, a radiation source for radiating X-rays is disposed above a patient lying on a lying table, and an electronic cassette is disposed between the lying table and the patient. The electronic cassette includes a phosphor for converting X-rays into an amount of visible light proportional to the intensity of the X-rays and a photoelectric transducer for converting the visible light into an electric signal proportional to the intensity of the visible light. The X-rays radiated from the radiation source pass through an affected area of the patient, and are detected by the phosphor of the electronic cassette and converted into visible light. The visible light is converted by the photoelectric transducer into an electric signal, thereby generating an image signal representing a radiation image of the affected area of the patient.

According to the radiation image capturing system disclosed in Japanese Laid-Open Patent Publication No. 2002-248095, the electronic cassette is disposed between the lying table and the patient at a position that is aligned with the affected area of the patient. If the patient moves while the X-rays are being applied to the patient, then the captured radiation image is blurred, and hence a proper radiation image cannot be produced using the electronic cassette. When the radiation image capturing system thus fails to capture a proper radiation image of the patient, it is necessary to use a new electronic cassette to perform the radiation image capturing process again. Such a repetitive action is tedious, time-consuming, and inefficient.

SUMMARY OF THE INVENTION

It is a general object of the present invention to provide a cassette and a radiation image capturing system which will inhibit an image capturing process from being performed when a movement of a subject is detected, for thereby preventing an imperfect radiation image of the subject from being captured and allowing a proper radiation image of the subject to be captured efficiently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
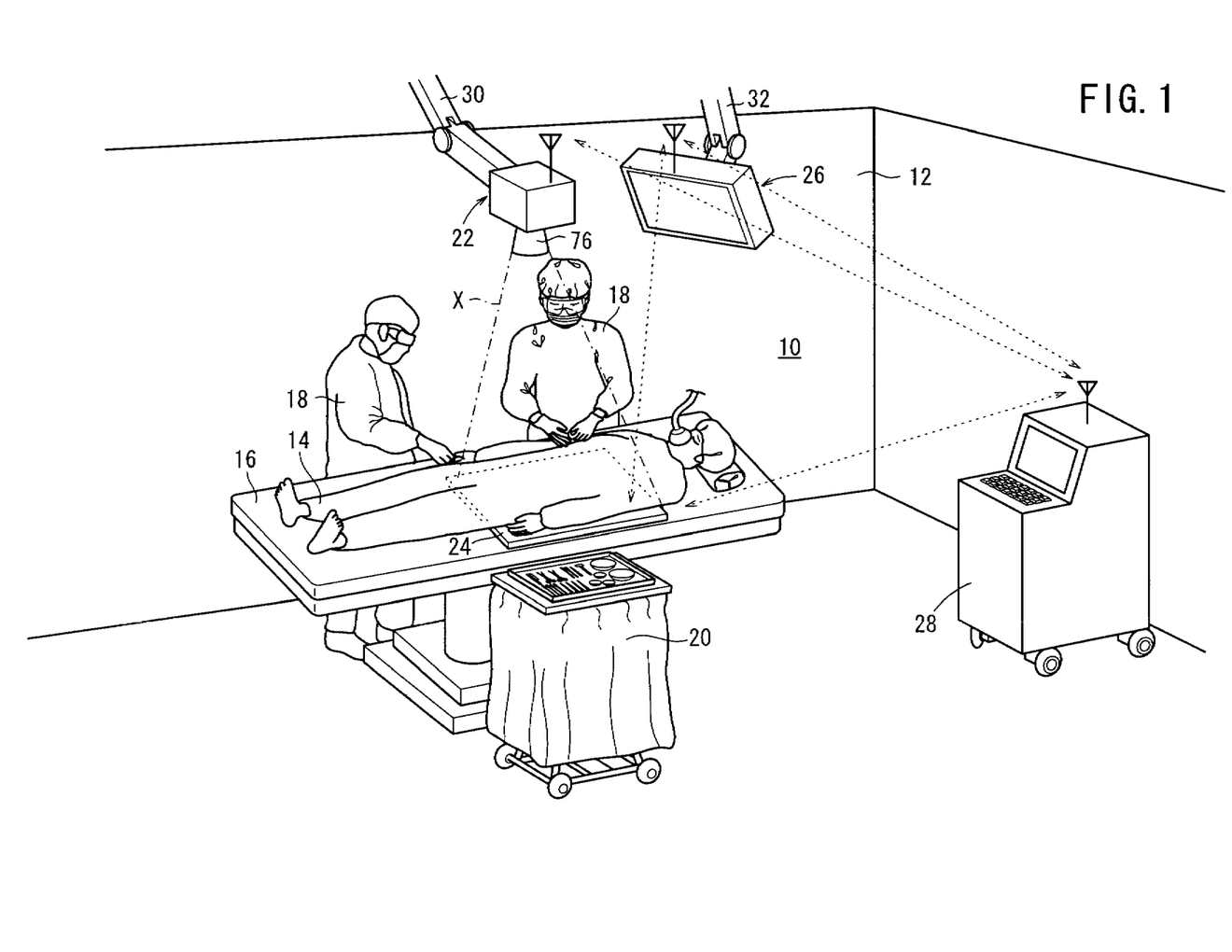
FIG. 1 is a perspective view inside an operating room incorporating a radiation image capturing system according to an embodiment of the present invention.
Figure 2:
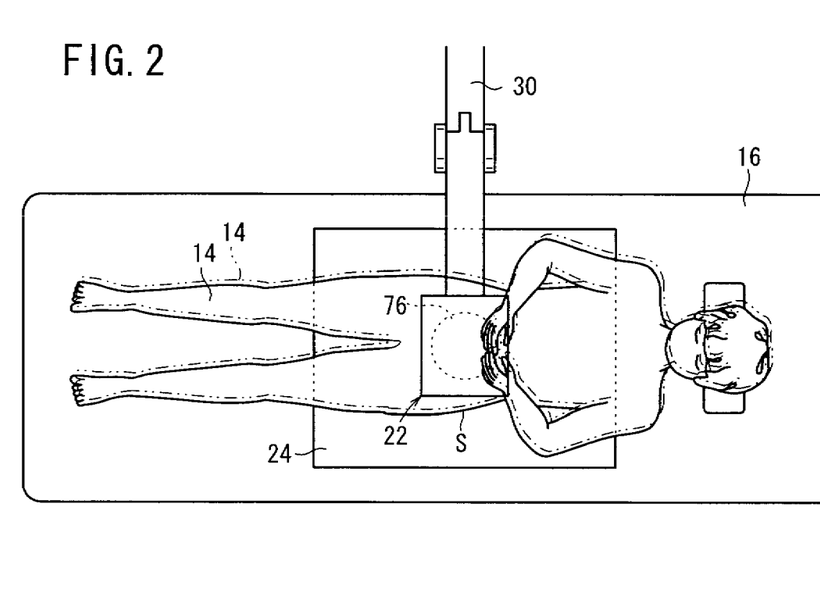
FIG. 2 is a plan view of a surgical table with a patient lying thereon in the operating room shown in FIG. 1.

FIGS. 1 and 2 show in perspective an operating room 12 incorporating a radiation image capturing system 10 according to an embodiment of the present invention. As shown in FIG. 1, the operating room 12 has, in addition to the radiation image capturing system 10, a surgical table 16 for a patient (subject) 14 to lie thereon, and an instrument table 20 disposed to one side of the surgical table 16 for placing thereon various tools and instruments to be used by surgeons 18 operating on the patient 14. The surgical table 16 is surrounded by various apparatus required for surgical operations, including an anesthesia apparatus, an aspirator, an electrocardiograph, a blood pressure monitor, etc.

The radiation image capturing system 10 includes an image capturing apparatus 22 for irradiating the patient 14 with a radiation X at a dosage according to image capturing conditions, a radiation detecting cassette 24 housing therein a radiation detector (radiation conversion panel) 40, to be described later, for detecting the radiation X that has passed through the patient 14, a display device 26 for displaying a radiation image based on the radiation X that is detected by the radiation detector 40, and a console 28 for controlling the image capturing apparatus 22, the radiation detecting cassette 24, and the display device 26. The image capturing apparatus 22, the radiation detecting cassette 24, the display device 26, and the console 28 send and receive signals by way of wireless communications.

The image capturing apparatus 22 is coupled to a universal arm 30 so as to be movable to a desired position for capturing an image at a desired area of the patient 14, and also to be retractable to an out of the way position while the surgeons 18 are performing a surgical operation on the patient 14. Similarly, the display device 26 is coupled to a universal arm 32 so as to be movable to a position where the surgeons 18 can easily confirm a captured radiation image displayed on the display device 26.

Figure 3:
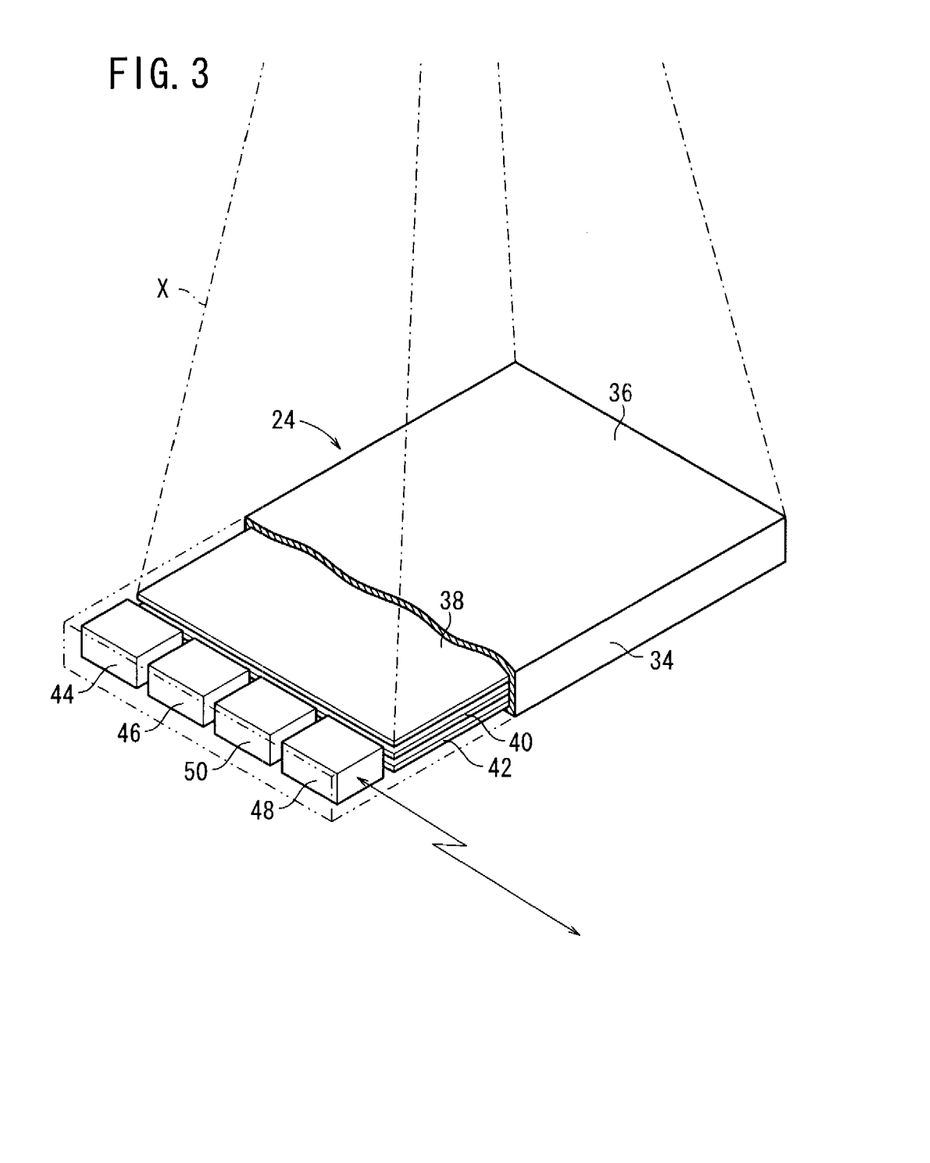
FIG. 3 is a perspective view, partly cut away, showing internal structural details of a radiation detecting cassette used in the radiation image capturing system.

FIG. 3 shows internal structural details of the radiation detecting cassette 24. As shown in FIG. 3, the radiation detecting cassette 24 has a casing 34 made of a material permeable to the radiation X. The casing 34 houses therein a grid 38 for removing scattered rays from the radiation X from the patient 14, a radiation detector 40 for detecting the radiation X that has passed through the patient 14, and a lead plate 42 for absorbing back scattered rays from the radiation X. The grid 38, the radiation detector 40 and the lead plate 42 are successively arranged in that order from an irradiated surface 36 of the casing 34, which is irradiated with the radiation X. The irradiated surface 36 of the casing 34 may be constructed as the grid 38.

The casing 34 also houses therein a battery 44 as a power supply of the radiation detecting cassette 24, a cassette controller 46 for energizing the radiation detector 40 with electric power supplied from the battery 44, a transceiver 48 for sending and receiving signals including the information of the radiation X detected by the radiation detector 40, to and from the console 28, and a detector (detecting unit) 50 for detecting an external load applied to the radiation detecting cassette 24.

The detector 50 comprises, for example, a pressure sensor for detecting a pressure (load) applied to the casing 34, and outputs a detected signal representative of a pressure value (load value) detected thereby to the cassette controller 46.

A shield plate of lead or the like such as the lead plate 42 should preferably be placed over the side surfaces of the cassette controller 46, the transceiver 48, and the detector 50 under the irradiated surface 36 of the casing 34 to protect the cassette controller 46, the transceiver 48, and the detector 50 against damage which would otherwise be caused if those were irradiated with the radiation X.

Figure 4:
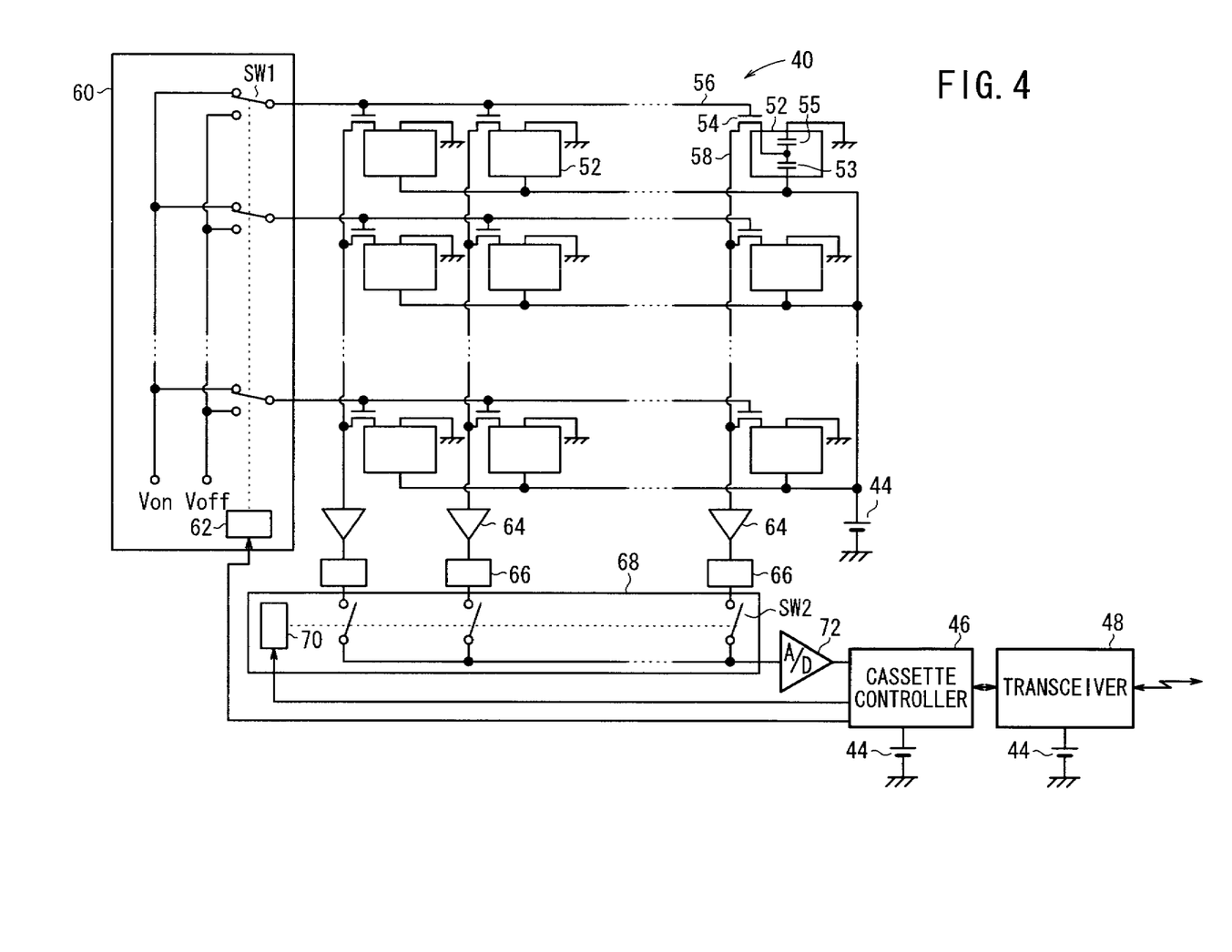
FIG. 4 is a block diagram of a circuit arrangement of a radiation detector.

FIG. 4 shows in block form a circuit arrangement of the radiation detector 40. As shown in FIG. 4, the radiation detector 40 comprises an array of thin-film transistors (TFTs) 54 arranged in rows and columns, a photoelectric conversion layer 53 made of a material such as amorphous selenium (a-Se) for generating electric charges upon detection of the radiation X, the photoelectric conversion layer 53 being disposed over the array of TFTs 54, and an array of storage capacitors 55 connected to the photoelectric conversion layer 53. When the radiation X is applied to the radiation detector 40, the photoelectric conversion layer 53 generates electric charges, and the storage capacitors 55 store the generated electric charges. Then, the TFTs 54 are turned on along each row at a time to read out the electric charges from the storage capacitors 55 as an image signal. In FIG. 4, the photoelectric conversion layer 53 and one of the storage capacitors 55 are shown as a pixel 52, and the pixel 52 is connected to one of the TFTs 54. Details of the other pixels 52 are omitted from illustration. Since amorphous selenium tends to change its structure and lose its functionality at high temperatures, amorphous selenium needs to be used within a certain temperature range. Therefore, some means for cooling the radiation detector 40 should preferably be provided in the radiation detecting cassette 24.

The TFTs 54 connected to the respective pixels 52 are connected to respective gate lines 56 extending parallel to the rows and respective signal lines 58 extending parallel to the columns. The gate lines 56 are connected to a line scanning driver 60, and the signal lines 58 are connected to a multiplexer 68 serving as a reading circuit.

The gate lines 56 are supplied with control signals Von, Voff from the line scanning driver 60 for turning on and off the TFTs 54 along the rows. The line scanning driver 60 comprises a plurality of switches SW1 for switching between the gate lines 56 and an address decoder 62 for outputting a selection signal for selecting one of the switches SW1 at a time. The address decoder 62 is supplied with an address signal from the cassette controller 46.

The signal lines 58 are supplied with electric charges stored in the storage capacitors 55 of the pixels 52 through the TFTs 54 arranged in the columns. The electric charges supplied to the signal lines 58 are amplified by amplifiers 64 connected respectively to the signal lines 58. The amplifiers 64 are connected through respective sample and hold circuits 66 to the multiplexer 68. The multiplexer 68 comprises a plurality of switches SW2 for switching between the signal lines 58 and an address decoder 70 for outputting a selection signal for selecting one of the switches SW2 at a time. The address decoder 70 is supplied with an address signal from the cassette controller 46. The multiplexer 68 has an output terminal connected to an A/D converter 72. A radiation image signal generated by the multiplexer 68 based on the electric charges from the sample and hold circuits 66 is converted by the A/D converter 72 into a digital image signal representing radiation image information, which is supplied to the cassette controller 46.

Figure 5:
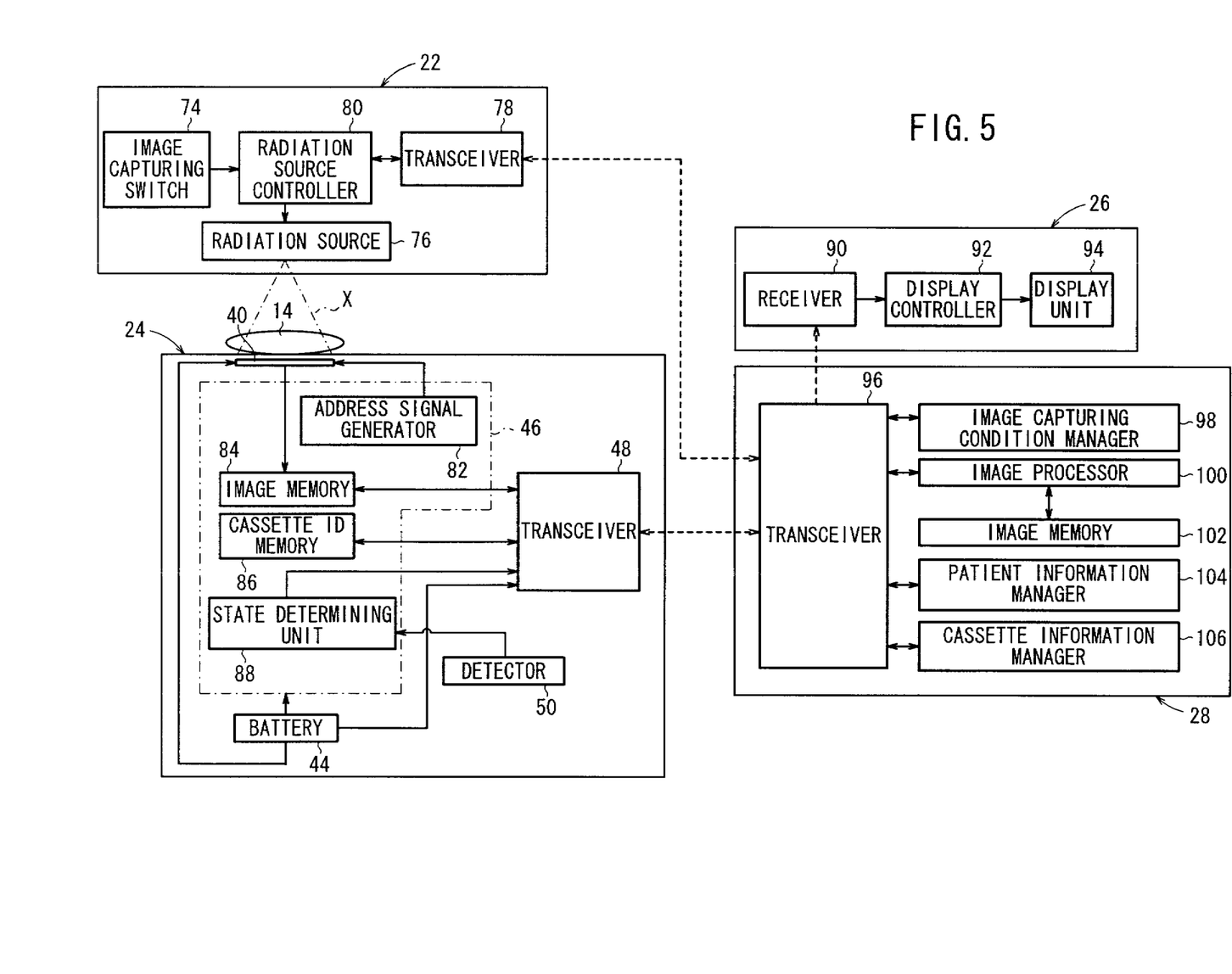
FIG. 5 is a block diagram of the radiation image capturing system.

FIG. 5 shows in block form the radiation image capturing system 10 which comprises the image capturing apparatus 22, the cassette 24, the display device 26, and the console 28.

The image capturing apparatus 22 comprises an image capturing switch 74, a radiation source 76 for outputting the radiation X, a transceiver 78 for receiving image capturing conditions from the console 28 by way of wireless communications and transmitting an image capturing completion signal, etc. to the console 28 by way of wireless communications, and a radiation source controller 80 for controlling the radiation source 76 based on an image capturing start signal supplied from the image capturing switch 74 and image capturing conditions supplied from the transceiver 78.

The radiation detecting cassette 24 houses therein the radiation detector 40, the battery 44, the cassette controller 46, the transceiver 48, and the detector 50.

The cassette controller 46 comprises an address signal generator 82 for supplying address signals to the address decoder 62 of the line scanning driver 60 and the address decoder 70 of the multiplexer 68 of the radiation detector 40, an image memory 84 for storing the radiation image information detected by the radiation detector 40, a cassette ID memory 86 for storing cassette ID information for identifying the radiation detecting cassette 24, and a state determining unit 88 for being supplied with a detected result from the detector 50 and determining whether or not the patient 14 has moved before or during the radiation image capturing process.

Specifically, the state determining unit 88 is supplied with a load value F applied to the radiation detecting cassette 24 based on the detected result from the detector 50, calculates an amount of movement of the patient 14 based on the load value F, and determines whether or not the patient 14 has moved from a given image capturing posture S (see FIG. 2) facing the image capturing apparatus 22, based on the amount of movement.

The state determining unit 88 thus functions as a determining means for determining whether or not the patient 14 has moved before or during the radiation image capturing process, based on the load value F applied to the radiation detecting cassette 24.

The transceiver 48 receives a transmission request signal from the console 28 by way of wireless communications and transmits the cassette ID information stored in the cassette ID memory 86, the radiation image information stored in the image memory 84, and the determined result from the state determining unit 88 based on the load value F detected by the detector 50, to the console 28 by way of wireless communications.

The display device 26 comprises a receiver 90 for receiving radiation image information from the console 28, a display controller 92 for controlling the display of the received radiation image information, and a display unit (warning unit) 94 for displaying the radiation image information processed by the display controller 92.

The console 28 comprises a transceiver 96 for transmitting and receiving necessary information including radiation image information to and from the image capturing apparatus 22, the radiation detecting cassette 24, and the display device 26 by way of wireless communications, an image capturing condition manager 98 for managing image capturing conditions required for the image capturing apparatus 22 to capture radiation images, an image processor 100 for processing radiation image information transmitted from the radiation detecting cassette 24, an image memory 102 for storing the radiation image information processed by the image processor 100, a patient information manager 104 for managing patient information of the patient 14 whose images are to be captured, and a cassette information manager 106 for managing cassette information transmitted from the radiation detecting cassette 24.

The console 28 may be located outside of the operating room 12 insofar as it can transmit and receive signals to and from the image capturing apparatus 22, the radiation detecting cassette 24, and the display device 26 by way of wireless communications.

The radiation image capturing system 10 according to the present embodiment is basically constructed as described above, and operation of the radiation image capturing system 10 will be described below.

The radiation image capturing system 10 is installed in the operating room 12 and used when a radiation image of the patient 14 is required by the surgeons 18 who are performing an operation on the patient 14. Before a radiation image of the patient 14 is captured, patent information of the patient 14 to be imaged is registered in the patient information manager 104 of the console 28. If an area of the patient 14 to be imaged and an image capturing method have already been known, such information is registered as image capturing conditions in the image capturing condition manager 98. After the above preparatory process is completed, the surgeons 18 perform an operation on the patient 14.

For capturing a radiation image of the patient 14 during the operation, one of the surgeons 18 or the radiological technician places the radiation detecting cassette 24 in a given position between the patient 14 and the surgical table 16 with the irradiated surface 36 facing the image capturing apparatus 22.

Then, after having moved the image capturing apparatus 22 to a position confronting the radiation detecting cassette 24, one of the surgeons 18 or the radiological technician turns on the image capturing switch 74 to capture a radiation image of the patient 14.

After a radiation image of the patient 14 has started to be captured by turning on the image capturing switch 74, it takes a certain time t until the radiation image of the patient 14 is completely captured. Specifically, the irradiation time of the radiation X differs depending on the area of the patient 14 to be imaged and the image capturing conditions. For example, if a radiation image of the chest of the patient 14 is to be captured, then the irradiation time of the radiation X is set to a relatively short time because the radiation image may possibly be blurred due to heartbeats.

If the patient 14 has moved in an image capturing process (as indicated by the two-dot-and-dash lines in FIG. 2), a load due to the movement of the patient 14 is applied to the radiation detecting cassette 24, and detected by the detector 50. The detector 50 outputs a detected signal representing the detected load to the state determining unit 88 of the cassette controller 46. The state determining unit 88 determines whether or not the patient 14 has moved from the given image capturing posture S during the process of capturing the radiation image.

Criteria used by the state determining unit 88 for determining whether or not the patient 14 has moved is established depending on the image capturing time spent by the image capturing apparatus 22, i.e., the length of the irradiation time of the radiation X emitted from the radiation source 76. If the length of the irradiation time of the radiation X is long, then an allowable amount of movement of the patient 14 is small. On the other hand, if the length of the irradiation time of the radiation X is short, then an allowable amount of movement of the patient 14 is large.

If it is judged that the patient 14 has moved from the given image capturing posture S based on the amount of movement of the patient 14 obtained from the load detected by the detector 50 and a length of the irradiation time of the radiation X preset in the image capturing condition manager 98, then the radiation X from the image capturing apparatus 22 may not be applied to the affected area of the patient 14 and the radiation detector 40 of the radiation detecting cassette 24, and a desired radiation image may be not captured. The state determining unit 88 outputs a signal through the transceivers 48, 96 to the console 28, controlling the console 28 and the display device 26 to display a warning indicating that the radiation detecting cassette 24 is not placed in a predetermined position. Based on the output signal from the state determining unit 88, the control 28 outputs a control signal to the radiation source controller 80 of the image capturing apparatus 22 to inhibit an image capturing operation of the image capturing apparatus 22. In other words, the state determining unit 88 also functions as an image capture inhibiting means for inhibiting the image capturing apparatus 22 from capturing a radiation image of the patient 14 based on the detected result from the detector 50.

Based on the warning displayed on the console 28 and the display device 26, the surgeons 18 or the radiological technician interrupts the image capturing operation, moves the patient 14 back to the given image capturing posture S, and then resumes the image capturing operation.

If the detector 50 has detected no load in the image capturing process, or if the amount of movement of the patient 14 is equal to or smaller than an allowable range in relation to the irradiation time of the radiation X, then it is judged that the patient 14 remains still in the given image capturing posture S or the amount of movement of the patient 14 is not large enough to blur a radiation image to be captured, and the image capturing operation is continued.

As described above, the image capturing process is performed while continuously detecting whether or not the patient 14 has moved in the image capturing process. The radiation source controller 80 of the image capturing apparatus 22 requests the console 28 to transmit the image capturing conditions from the image capturing condition manager 98 via the transceivers 78, 96. Based on the request, the console 28 transmits the image capturing conditions about the area of the patient 14 to be imaged to the image capturing apparatus 22 via the transceivers 78, 96. When the radiation source controller 80 receives the image capturing conditions, it controls the radiation source 76 to apply a radiation X at a given dosage to the patient 14 according to the image capturing conditions.

The radiation X which has passed through the patient 14 is applied to the grid 38, which removes scattered rays from the radiation X. Then, the radiation X is applied to the radiation detector 40, and converted into electric signals by the photoelectric conversion layer 53 of the pixels 52 of the radiation detector 40. The electric signals are stored as electric charges in the storage capacitors 55 (see FIG. 4). The stored electric charges, which represent radiation image information of the patient 14, are read out from the storage capacitors 55 according to address signals which are supplied from the address signal generator 82 of the cassette controller 46 to the line scanning driver 60 and the multiplexer 68.

Specifically, in response to the address signal supplied from the address signal generator 82, the address decoder 62 of the line scanning driver 60 outputs a selection signal to select one of the switches SW1, which supplies the control signal Von to the gates of the TFTs 54 connected to the gate line 56 corresponding to the selected switch SW1. On the other hand, in response to the address signal supplied from the address signal generator 82, the address decoder 70 of the multiplexer 68 outputs a selection signal to successively turn on the switches SW2 to switch between the signal lines 58, for thereby reading out the electric charges stored in the storage capacitors 55 of the pixels 52 connected to the selected gate line 56, through the signal lines 58.

The electric charges read out from the storage capacitors 55 of the pixels 52 connected to the selected gate line 56 are amplified by the respective amplifiers 64, sampled by the sample and hold circuits 66, and supplied to the multiplexer 68. Based on the supplied electric charges, the multiplexer 68 generates and supplies a radiation image signal to the A/D converter 72, which converts the radiation image signal into a digital signal. The digital signal which represents the radiation image information is stored in the image memory 84 of the cassette controller 46, and thereafter transmitted from the transceiver 48 to the console 28 by way of wireless communications.

Similarly, the address decoder 62 of the line scanning driver 60 successively turns on the switches SW1 to switch between the gate lines 56 according to the address signal supplied from the address signal generator 82. The electric charges stored in the storage capacitors 55 of the pixels 52 connected to the successively selected gate lines 56 are read out through the signal lines 58, and processed by the multiplexer 68 and the A/D converter 72 into digital signals. The digital signals which represent the radiation image information are stored in the image memory 84 of the cassette controller 46, and thereafter transmitted to the console 28.

The radiation image information transmitted to the console 28 is received by the transceiver 96, processed by the image processor 100, and then stored in the image memory 102 in association with the patient information of the patient 14 registered in the patient information manager 104.

The radiation image information processed by the image processor 100 is transmitted from the transceiver 96 to the display device 26. In the display device 26, the receiver 90 receives the radiation image information, and the display controller 92 controls the display unit 94 to display a radiation image based on the radiation image information. The surgeons 18 perform a surgical operation on the patient 14 while watching the radiation image displayed on the display unit 94.

Since no cables for transmitting and receiving signals are connected between the radiation detecting cassette 24 and the console 28, between the image capturing apparatus 22 and the console 28, and between the console 28 and the display device 26, it is not necessary to lay such cables on the floor of the operating room 12 and hence there are no cable-induced obstacles to the operation performed by the surgeons 18, the radiological technician, or other staff members in the operating room 12.

In the present embodiment described above, the detector 50 for detecting a change in the load applied to the radiation detecting cassette 24 at the time the patient 14 moves comprises a pressure sensor. However, the detector 50 may comprise a vibration sensor for detecting vibrations of the radiation detecting sensor or a contact sensor for detecting a contact of the patent 14 with the radiation detecting sensor.

Alternatively, the detector 50 may comprise a pressure sensor, a vibration sensor, and a contact sensor and detect a movement of the patient 14 based on a combination of detected signals from those sensors. In this manner, a movement of the patient 14 from the given image capturing posture S can be detected with higher accuracy.

In the above description, when a movement of the patient 14 is detected, the state determining unit 88 outputs a signal through the transceiver 48 to the console 28 to display a warning on the console 28, etc. However, the casing 34 of the radiation detecting cassette 24 may have a display unit, and an output signal from the state determining unit 88 may be supplied to the display unit for displaying a warning on the radiation detecting-cassette 24 at the time the patient 14 has moved. Alternatively, a warning may be displayed on another display unit on the console 28.

According to the present embodiment, as described above, the radiation detecting cassette 24 includes the detector 50 for detecting a load imposed on the radiation detecting cassette 24, at the time the patient 14 has moved, disposed between the patient 14 and the surgical table 16. Consequently, a movement of the patient 14 during the process of capturing a radiation image can be recognized. When the patient 14 has moved from the given image capturing posture S, the image capture inhibiting means inhibits the image capturing apparatus 22 from capturing a radiation image of the patient 14 based on the detected result from the detector 50. Therefore, blurred radiation images of the patent 14 are prevented from being produced, but appropriate radiation images of the patent 14 are produced at all times.

When a movement of the patient 14 during the process of capturing a radiation image is detected, the display unit 94 of the display device 26 displays a warning, which can reliably and easily be perceived visually.

When the radiation detecting cassette 24 is used in the operating room 12 or the like, the radiation detecting cassette 24 may be subjected to adhesion of blood, contamination, etc. However, when the radiation detecting cassette 24 is designed to have a waterproof and hermetically-sealed structure, and is sterilized and cleaned as necessary, one radiation detecting cassette 24 can be used repeatedly.

The radiation detecting cassette 24 is not limited to use in the operating room 12, and may be used for a medical examination and a round in the hospital.

Also, the radiation detecting cassette 24 may communicate with external devices via optical wireless communication using infrared light or the like, instead of general wireless communication using radio wave.

Figure 6:
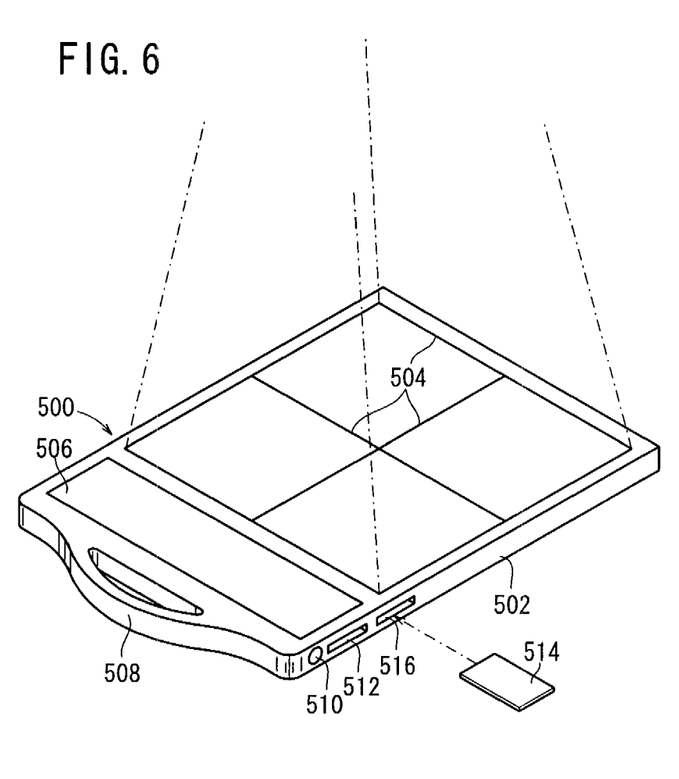
FIG. 6 is a perspective view showing another radiation detecting cassette used in the radiation image capturing system.

Preferably, the radiation detecting cassette 500 may be constructed as shown in FIG. 6.

Specifically, the radiation detecting cassette 500 includes a guiding line 504 drawn on the radiation-irradiated surface of a casing 502, the guiding line 504 serving as a reference for setting a captured area and a captured position. Using the guiding line 504, a subject can be positioned with respect to the radiation detecting cassette 500, and an area irradiated with the radiation can be set, thereby recording radiation image information on an appropriate captured area.

The radiation detecting cassette 500 is provided with a display section 506 on an area thereof other than the captured area, for displaying various information about the radiation detecting cassette 500. The information which is displayed on the display section 506, includes ID information of a subject whose radiation image information is to be recorded on the radiation detecting cassette 500, the number of times the radiation detecting cassette 500 has been used, an accumulated exposed radiation dose, a charging state (remaining battery level) of a battery 44 in the radiation detecting cassette 500, image capturing conditions of radiation image information, and a positioning image of the subject with respect to the radiation detecting cassette 500. In this case, a technician confirms a subject based on the ID information displayed on the display section 506, for example, and also previously confirms that the radiation detecting cassette 500 is placed in a usable state. Then, the technician positions a desired captured area of the subject with respect to the radiation detecting cassette 500 based on the displayed positioning image, thereby capturing appropriate radiation image information.

Also, the radiation detecting cassette 500 is provided with a handgrip 508, whereby it is easier to handle and carry the radiation detecting cassette 500.

Preferably, the radiation detecting cassette 500 may have, on a side thereof, an input terminal 510 for an AC adapter, a USB (Universal Serial Bus) terminal 512, and a card slot 516 for inserting a memory card 514.

When the charging function of the battery 44 in the radiation detecting cassette 500 becomes deteriorated, or when there is not enough time to fully charge the battery 44, the input terminal 510 is connected to the AC adapter to externally supply the radiation detecting cassette 500 with electric power, thereby enabling the radiation detecting cassette 500 to be used immediately.

The USB terminal 512 or the card slot 516 may be used when the radiation detecting cassette 500 cannot transmit and receive information to and from external devices such as the console 28 via wireless communication. Specifically, by connecting a cable to the USB terminal 512, the radiation detecting cassette 500 can transmit and receive information to and from the external devices via wire communication. Alternatively, the memory card 514 is inserted into the card slot 516, and necessary information is recorded on the memory card 514. After that, the memory card 514 is removed from the card slot 516, and the memory card 514 is inserted into the external device, thereby enabling information to be transferred.

Figure 7:
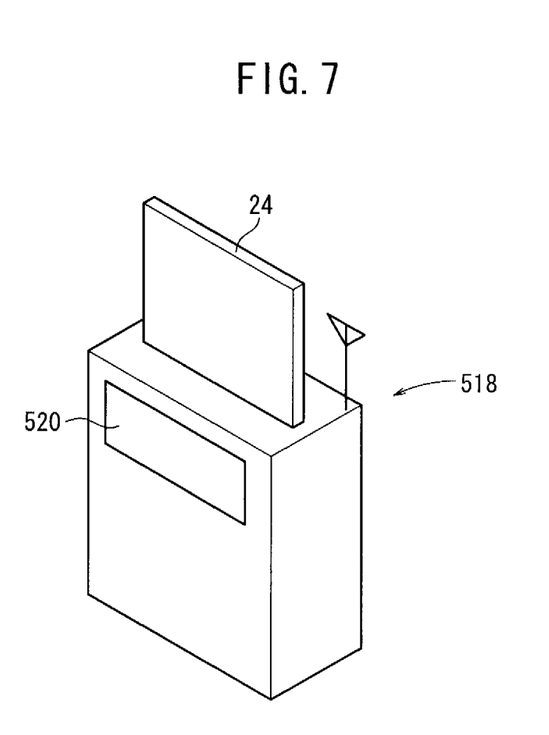
FIG. 7 is a perspective view showing a cradle which charges the radiation detecting cassette.

Preferably, a cradle 518 may be disposed in the operating room 12 or at a desired place in the hospital, into which the radiation detecting cassette 24 is inserted to charge the internal battery 44, as shown in FIG. 6. In this case, in addition to charging the battery 44, the cradle 518 may transmit and receive necessary information to and from external devices such as HIS, RIS, the console 28, etc. by way of wireless or wire communications of the cradle 518. The information may include radiation image information which is recorded on the radiation detecting cassette 24 inserted into the cradle 518.

Also, the cradle 518 may be provided with a display section 520. The display section 520 may display necessary information including a charging state of the inserted radiation detecting cassette 24 and radiation image information acquired from the radiation detecting cassette 24.

Further, a plurality of cradles 518 may be connected to a network. In this case, information about charging states of radiation detecting cassettes 24 inserted in respective cradles 518 can be collected through the network, and the radiation detecting cassette 24 in a usable state can be located.

Although a certain preferred embodiment of the present invention has been shown and described in detail, it should be understood that various changes and modifications may be made therein without departing from the scope of the appended claims.

What is claimed is:

1. A cassette storing therein a radiation conversion panel for detecting a radiation emitted from a radiation source that has passed through a patient, and converting the detected radiation into radiation image information, the cassette comprising:
    a detecting unit for detecting a movement of the patient from a given image capturing posture with respect to the cassette during a process of acquiring the radiation image information by emitting the radiation from the radiation source to the patient; and
    an image capture inhibiting unit for inhibiting the radiation image information of the patient from being captured,
    wherein the detecting unit is provided inside the cassette and configured to detect a load applied to the cassette by the patient,
    the radiation source is configured to continue emitting the radiation toward the patient when the detecting unit detects no load or an amount of movement of the patient is equal to or smaller than an allowable range in relation to an irradiation time of the radiation, and
    the image capture inhibiting unit is configured to inhibit the radiation image information of the patient from being captured when the detecting unit detects the amount of movement of the patient greater than an allowable range in relation to the irradiation time of the radiation.

2. The cassette according to claim 1, further comprising;
    warning unit for issuing a warning if the patient has moved relatively to the radiation source, based on the movement of the patient detected by the detecting unit.

3. The cassette according to claim 2, wherein the detecting unit has a variable detecting criterion for detecting the movement of the patient.

4. The cassette according to claim 3, wherein the detecting unit comprises a pressure sensor for detecting a change in a pressure applied by the patient to the cassette.

5. The cassette according to claim 3, wherein the detecting unit comprises a vibration sensor for detecting a vibration applied by the patient to the cassette.

6. The cassette according to claim 3, wherein the detecting unit comprises a contact sensor for detecting a contact of the patient with the cassette.

7. The cassette according to claim 3, wherein the detecting unit comprises:
    a pressure sensor for detecting a change in a pressure applied by the patient to the cassette;
    a vibration sensor for detecting a vibration applied by the patient to the cassette; and
    a contact sensor for detecting a contact of the patient with the cassette;

wherein the detecting unit detects a movement of the patient based on a combination of detected signals from the pressure sensor, the vibration sensor, and the contact sensor.

8. The cassette according to claim 3, wherein the detecting criterion is established depending on an area of the patient whose radiation image is to be captured.

9. The cassette according to claim 8, wherein the detecting criterion is established depending on image capturing conditions for the patient.

10. The cassette according to claim 1, wherein the detecting unit is placed in at least two locations in the cassette, and detects the movement of the patient based on a combination of detected results from the at least two locations.

11. A radiation image capturing system comprising:
a radiation source which emits radiation toward a patient;
a cassette storing therein a radiation conversion panel for detecting the radiation emitted from the radiation source that has passed through the patient and converting the detected radiation into radiation image information;
a detecting unit disposed in the cassette for detecting a movement of the patient from a given image capturing posture with respect to the cassette during a process of acquiring the radiation image information by emitting the radiation from the radiation source to the patient; and
an image capture inhibiting unit for inhibiting the radiation image information of the patient from being captured if the patient has moved with respect to the radiation source, based on the movement of the patient detected by the detecting unit,
wherein the detecting unit detects a load applied to the cassette by the patient,
the radiation source is configured to continue emitting the radiation toward the patient when the detecting unit detects no load or an amount of movement of the patient is equal to or smaller than an allowable range in relation to an irradiation time of the radiation, and
the image capture inhibiting unit is configured to inhibit the radiation image information of the patient from being captured when the detecting unit detects the amount of movement of the patient greater than an allowable range in relation to the irradiation time of the radiation.

12. The radiation image capturing system according to claim 11, further comprising:
warning unit for issuing a warning if the patient has moved relatively to the radiation source, based on the movement of the patient detected by the detecting unit.

13. The radiation image capturing system according to claim 12, wherein the detecting unit comprises a pressure sensor for detecting a change in a pressure applied by the patient to the cassette.

14. The radiation image capturing system according to claim 12, wherein the detecting unit comprises a vibration sensor for detecting a vibration applied by the patient to the cassette.

15. The radiation image capturing system according to claim 12, wherein the detecting unit comprises a contact sensor for detecting a contact of the patient with the cassette.

16. The radiation image capturing system according to claim 12, wherein the detecting unit comprises:
a pressure sensor for detecting a change in a pressure applied by the patient to the cassette;
a vibration sensor for detecting a vibration applied by the patient to the cassette; and
a contact sensor for detecting a contact of the patient with the cassette;
wherein the detecting unit detects a movement of the patient based on a combination of detected signals from the pressure sensor, the vibration sensor, and the contact sensor.

17. The radiation image capturing system according to claim 11, wherein the detecting unit is placed in at least two locations in the cassette, and detects the movement of the patient based on a combination of detected results from the at least two locations.

* * * * *